(12) United States Patent
Brombach

(10) Patent No.: US 6,823,729 B2
(45) Date of Patent: Nov. 30, 2004

(54) MEASURING WEIR FOR MEASURING FLOW VOLUME AT AN OVERFLOW

(76) Inventor: Hansjörg Brombach, Von-Berlichingen-Strasse 21, Bad Mergentheim (DE)

( * ) Notice: Subject to any disclaimer, the term of this patent is extended or adjusted under 35 U.S.C. 154(b) by 0 days.

(21) Appl. No.: 10/423,821

(22) Filed: Apr. 25, 2003

(65) Prior Publication Data

US 2003/0221484 A1 Dec. 4, 2003

(30) Foreign Application Priority Data

May 6, 2002 (DE) .......................................... 10221319

(51) Int. Cl.[7] .............................................. G01F 1/20
(52) U.S. Cl. ...................................................... 73/215
(58) Field of Search .......................................... 73/215

(56) References Cited

U.S. PATENT DOCUMENTS 4,252,132 A * 2/1981 Kuntz ........................ 73/215

FOREIGN PATENT DOCUMENTS

EP 477 745 4/1992

OTHER PUBLICATIONS

ISO 1438/1 (1980) Intl'l Org. for Standardization "Water flow measurement in open channels using weirs and . . . ".

ATV Arbeitsblat A111 (Feb. 1994) Ges. zur Forderung der Abwassertechnik, "Richtlinen fur die hydraulische Dimensionierung und den . . . ".

* cited by examiner

Primary Examiner—Harshad Patel
(74) Attorney, Agent, or Firm—Herbert Dubno; Andrew Wilford

(57) ABSTRACT

A flow-measuring system has a weir wall bounded on a front face by a body of water and having a rear face and a top edge over which water from the body flows. A structure generally formed as an airfoil is mounted on the top edge such that water flowing over the weir wall must flow over the structure.

16 Claims, 2 Drawing Sheets

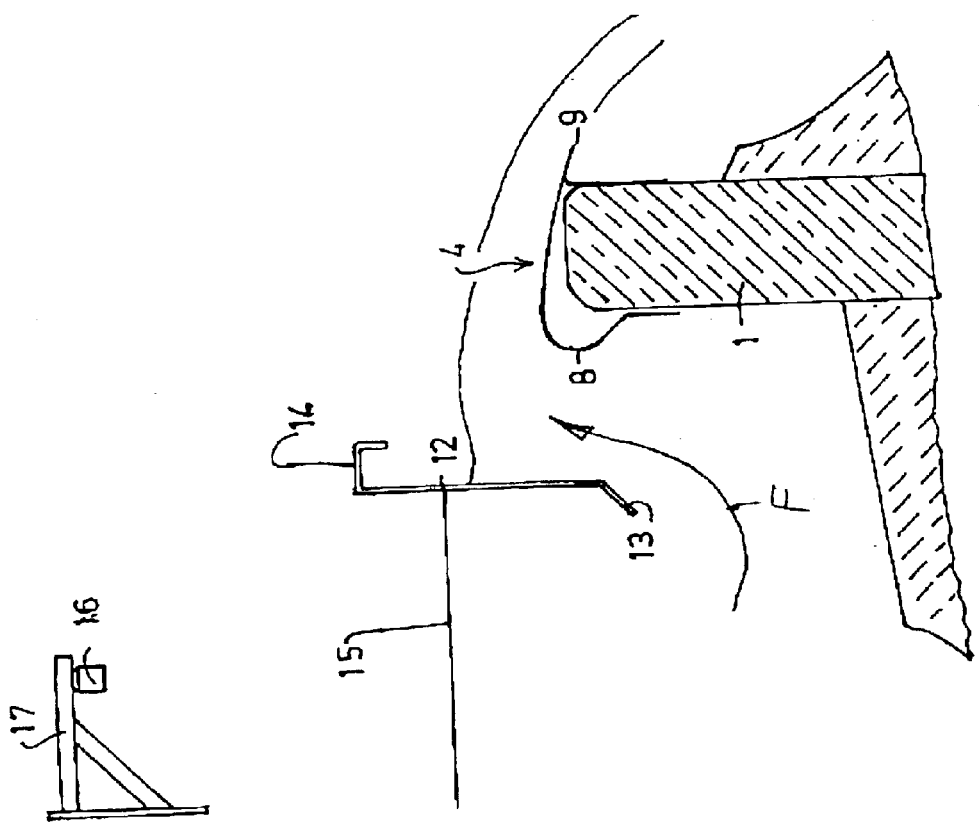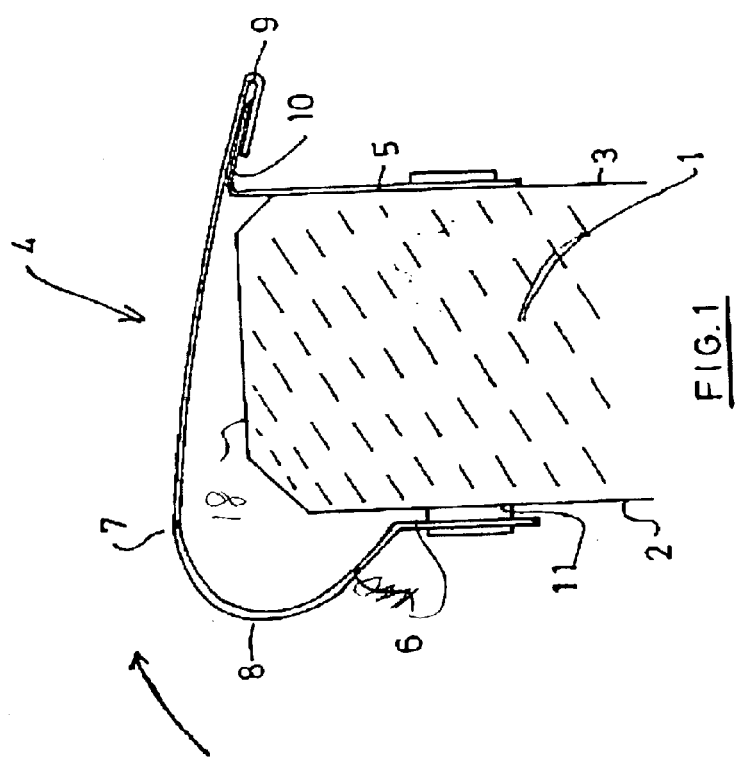

MEASURING WEIR FOR MEASURING FLOW VOLUME AT AN OVERFLOW

FIELD OF THE INVENTION

The present invention relates to a measuring weir for liquids. More particularly this invention concerns such a weir used in rivers, channels, sewers and at combined sewer overflows (CSO) for determining the flow rate of water flowing over it.

BACKGROUND OF THE INVENTION

Such a weir is used to determine the actual flow rate in l/s or the flow capacity in m³/a that passes over itself. It is furthermore known that well established overflow weirs work only with a limited overflow range. There are however circumstances when the overflow for a long time is rather small and then can briefly have a great volume. A wide range of flowrates in a length- and short-term mode should be correctly determined.

With the known overflow weirs there is no satisfactory correlation between the overflow rate and the upstream water level above the upper edge of the overflow weir. In order to measure the overflow amount sharp-edge weirs have been suggested (ATV A 111, ISO 1438). These are identical to the measuring weirs of Rehbock. With such sharp-edged weirs there is with small drops of less than 30 mm an uncontrolled adhesion or release of the overflow stream from the rear side of the weir and thus there is strong hysteresis in the discharge rating curve. The often proposed artificial aeration of the underside of the overflowing stream is not effective and not practicable. With overflow heads of less than 10 mm there are further problems created by water surface tension.

A sharp-edged weir has with substantial overflow heads a high resistance to flow expressed as a small $\mu$ value in the overflow formula of Poleni. Small $\mu$ values produce large heads. Backwater is created in the upstream canal network.

To control flow in rivers or over dams, broad crested weirs with rounded tops are known. Such rounding is employed in order to allow substantial volumes of water to pass with minimal head losses and noise. Such weirs are however not usable in waste-water systems due to their limited measuring range.

In order to improve measurements a top profile for an overflow measuring weir is known that is made of a combination of a standard profile top and a horizontally extending downstream portion projecting from the rear side of the weir. The standard profile top is relatively greatly curved and forms a nearly straight rear face with an angle of about 45° merging over a concave transition with a nearly horizontal rear surface (EP 0,477,745).

The problem of getting accurate measurements is furthermore made harder by the normal use upstream of the overflow weir of a scum board or baffle which serves to prevent flotsam and light liquids from escaping out of the waste-water system. With high flow volumes such baffles substantially disrupt the water flow.

OBJECTS OF THE INVENTION

It is therefore an object of the present invention to provide an improved flow-measuring weir.

Another object is the provision of such an improved flow-measuring weir which overcomes the above-given disadvantages, that is which can produce accurately reproducible and free of hysteresis measurements over a wide range of flows with relatively little flow resistance with great overflow rates and high resistance at low flow rates.

SUMMARY OF THE INVENTION

These objects are attained in a flow-measuring system having a weir wall bounded on a front face by a body of water and having a rear face and a top edge over which water from the body flows that is provided with structure generally formed as an airfoil on the top edge positioned such that water flowing over the weir wall must flow over the structure.

Such a weir-wall structure designed according to aerodynamic principles does not actually create lift on its upper side, but ensures that the water flowing over it remains on its upper side and exits as a smooth sheet from the rear edge. Thus even without aeration, the structure is free of hysteresis.

According to the invention the structure is mounted on the weir wall and is a separate element. In a standard application, the wall itself is made of reinforced concrete and the airfoil-shaped structure is installed on it after construction. This makes it possible to provide a perfectly shaped structure on top of a wall that is built to less strict tolerances.

In accordance with the invention the structure has a forward high point and a rear edge and is smoothly and gently upwardly convex between the high point and the rear edge. It has no concave turbulence-creating portions that could cause lift-off or even cavitation at high flow speeds. In addition the rear edge is horizontally rearwardly directed and sharp. Thus even with a low flow speed or a small drop, the water will separate easily from the lower edge of the structure at a defined and given point as a smooth curtain that will drop generally free of the rear wall face that is spaced well forward of this rear edge.

The structure extends downward according to the invention at an angle between 10° and 15° from the front high point to the rear edge. This convexity ensures that the water stays in contact with the upper structure surface. The gentle rounding is completely barrier free. Thus even with very light flow of 1 l/(s m) the flow regime is dominated by shear stress and boundary layer effects and it is possible to measure reproducible $\mu$ values. This is a huge advantage when measuring modest flows.

With larger flows the airfoil shape is very advantageous so that a large volume of water can flow over it with small losses. Gravity flow is dominating this regime. Once a certain minimal flow over the rear edge is ensured, the flow volume can grow to virtually any size with no difference in the capacity to measure it.

In addition in accordance with the invention the forward high point is generally level with the front face of the wall, normally directly aligned with it. The structure is formed forward of the high point with a horizontally forwardly directed smooth bulge. It is made of smooth stainless steel and is vertically adjustable on the wall, for instance by securing it in place with screws extending through vertical slots. It is also of horizontally adjustable width, something made possible by making it of two parts, one fitted into a horizontal slot of the other. What is more the structure can be made of a succession of pieces spaced along the wall and interfitting with slip joints to compensate for thermal expansion.

The structure is associated with an upstream baffle or scum board having a lower edge in the body of water forward of the front face. This baffle lower edge is bent forward away from the wall. Furthermore a sensor is provided forward of the baffle for measuring a level of an upper surface of the body of water, preferably one that works by ultrasonic reflection or the like so that it does not actually have to touch the water.

BRIEF DESCRIPTION OF THE DRAWING

The above and other objects, features, and advantages will become more readily apparent from the following description, reference being made to the accompanying drawing in which:

FIG. 1 is a vertical section through a weir according to the invention;

FIG. 2 is a partly diagrammatic side view partly in vertical section through a flow-measuring system in accordance with the invention.

SPECIFIC DESCRIPTION

Figure 3:
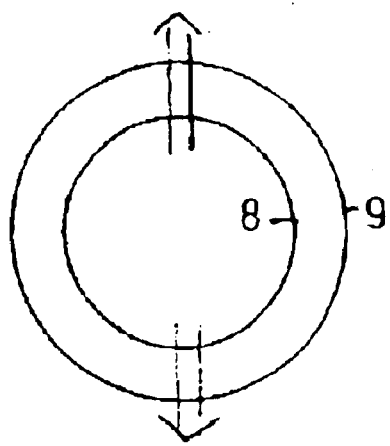
FIGS. 3–6 are possible shapes of the weir as seen from above.

As seen in FIG. 1 a standard weir wall 1, for instance made of concrete, has a vertical front face 2 normally delimiting a body of waste water and a vertical rear face 3. A structure 4 of smooth sheet stainless steel and formed of two parts has a planar rear portion fixed to the rear wall 3 and a planar front portion fixed to the front wall 2, both by screw anchors 11 fitting through vertical slots so the vertical position of the structure 4 can be adjusted. An upper edge 18 of the wall 1 extends mainly horizontally between the front face 2 and rear face 3.

The structure 4 has an uppermost point 7 extending perpendicular to the flow. Forward of this point 7 it has a forwardly convex generally circular-section bulge whose lower edge merges with the upper edge of the front portion 6. Rearward of this point it extends smoothly back and down at between 10° and 15° with slight upward convexity to terminate at a folded-over rear end 9 fitting over a rearwardly and downwardly projecting flange 10 projecting from the upper edge of the rear portion 5. The interfit of the flange 10 in the doubled-over rear edge 9 makes the structure 4 of horizontally adjustable size to accommodate walls 1 of different widths. Thus the structure 4 basically has above the portions 5 and 6 the shape of an airfoil.

Flow over the structure 4 will be extremely smooth. Due to the slight convexity and the weight of the water, there will be no lift, as on an airfoil, but the overflowing layer of water will be sucked down over the sliding downback and there will be clean separation of the water layer at the rear edge 9. Flow will be diverted away from the rear face 3 and will cascade downward as a smooth sheet.

Such an arrangement is used in conjunction with a standard vertical baffle 12 as shown in FIG. 2. Here the liquid surface 15 is well above the structure so that flow moves as shown by arrows F under a forwardly bent lower edge 13 of the baffle 12. The upper edge of the baffle 12 is bent over in two sections, imparting to it an inverted J-shape, so as to rigidify it. A support 17 for a sensor 16 that measures the height of the liquid level 15 is provided forward of the baffle 12. The sensor 16 emits an ultrasonic signal which is reflected by the surface of the liquid. The time of travel of this signal is measured and indicates the distance between the sensor 16 and the surface of the liquid.

Figure 5:
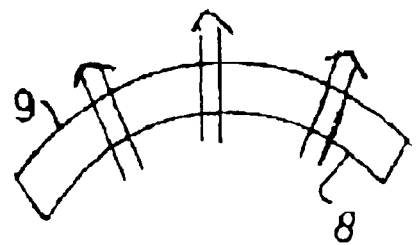
Figure 6:
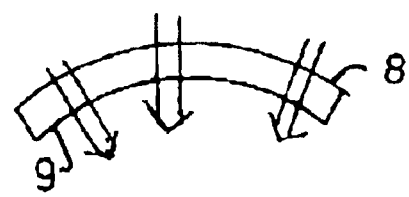

In most cases the front of the structure is straight as indicated in FIGS. 1 and 2. It is, however, also possible that the front and rear edge of the structure are curved as shown in FIGS. 5 and 6. In FIG. 5 the flow is from the inside of the curvature to the outside as indicated by the arrows. In FIG. 6 the flow is from the outside of the curvature to the inside as also indicated by the arrows.

Figure 4:
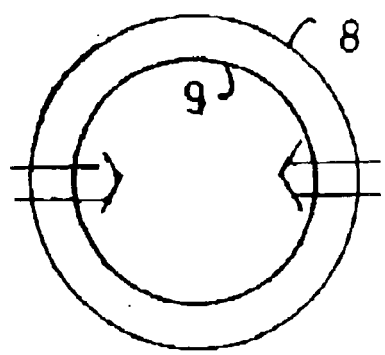

It is also possible that the structure is a closed structure as indicated in FIGS. 3 and 4. In FIG. 3 the flow is from the inside of the circular structure to the outside, and in FIG. 4 the flow is from the outside to the inside of the structure.

I claim:

1. In a flow-measuring system having a weir wall bounded on a front face by a body of water and having a rear face and a top edge over which water from the body flows, the improvement comprising structure generally formed as an airfoil on the top edge positioned such that water flowing over the weir wall must flow over the structure.

2. The improvement defined in claim 1 wherein the structure is mounted on the weir wall.

3. The improvement defined in claim 1 wherein the structure has a forward high point and a rear edge and is smoothly and gently upwardly convex between the high point and the rear edge.

4. The improvement defined in claim 3 wherein the rear edge is horizontally rearwardly directed and sharp.

5. The improvement defined in claim 3 wherein the structure extends downward at an angle between 10° and 15° from the front high point to the rear edge.

6. The improvement defined in claim 3 wherein the forward high point is generally level with the front face of the wall.

7. The improvement defined in claim 3 wherein the structure is formed forward of the high point with a horizontally forwardly directed smooth bulge.

8. The improvement defined in claim 1 wherein the structure is made of smooth stainless steel.

9. The improvement defined in claim 1 wherein the structure is vertically adjustable on the wall.

10. The improvement defined in claim 1 wherein the structure is of horizontally adjustable width.

11. The improvement defined in claim 1, further comprising a baffle having a lower edge in the body of water forward of the front face.

12. The improvement defined in claim 11 wherein the baffle lower edge is bent forward away from the wall.

13. The improvement defined in claim 11, further comprising means forward of the baffle including a sensor for measuring a level of an upper surface of the body of water.

14. The improvement defined in claim 1 wherein the front face of the structure is straight.

15. The improvement defined in claim 1 wherein the front face of the structure is rounded.

16. The improvement defined in claim 1 wherein the front face of the structure is circular.

* * * * *